us008286026B2

(12) United States Patent
Rao et al.

(10) Patent No.: US 8,286,026 B2
(45) Date of Patent: *Oct. 9, 2012

(54) FAULT-TOLERANCE AND FAULT-CONTAINMENT MODELS FOR ZONING CLUSTERED APPLICATION SILOS INTO CONTINUOUS AVAILABILITY AND HIGH AVAILABILITY ZONES IN CLUSTERED SYSTEMS DURING RECOVERY AND MAINTENANCE

(75) Inventors: Sudhir G. Rao, Portland, OR (US); Bruce M. Jackson, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,209

(22) Filed: Feb. 13, 2012

(65) Prior Publication Data

US 2012/0166866 A1 Jun. 28, 2012

Related U.S. Application Data

(63) Continuation of application No. 11/170,331, filed on Jun. 29, 2005.

(51) Int. Cl.
*G06F 11/00* (2006.01)
(52) U.S. Cl. .................... 714/4.1; 714/4.11; 714/4.12
(58) Field of Classification Search .............. 714/4.1, 714/4.11, 4.12
See application file for complete search history.

(56) References Cited

U.S. PATENT DOCUMENTS

| 6,151,689 | A | 11/2000 | Garcia et al. |
|---|---|---|---|
| 6,393,485 | B1 * | 5/2002 | Chao et al. ................ 709/231 |
| 6,418,539 | B1 | 7/2002 | Walker |
| 6,986,076 | B1 * | 1/2006 | Smith et al. ................ 714/4.11 |
| 7,120,821 | B1 * | 10/2006 | Skinner et al. ............. 714/4.4 |
| 7,139,925 | B2 | 11/2006 | Dinker et al. |
| 7,287,186 | B2 * | 10/2007 | McCrory et al. ............ 714/13 |
| 7,370,223 | B2 | 5/2008 | Olmstead et al. |
| 7,418,633 | B1 | 8/2008 | Salpekar et al. |
| 7,464,378 | B1 * | 12/2008 | Limaye et al. ............. 718/100 |
| 7,478,275 | B1 | 1/2009 | Deolasee et al. |
| 7,640,328 | B1 | 12/2009 | Lele |
| 7,734,960 | B2 * | 6/2010 | Mandal ...................... 714/43 |

(Continued)

FOREIGN PATENT DOCUMENTS

CN 1512329 7/2004

(Continued)

*Primary Examiner* — Scott Baderman
*Assistant Examiner* — Loan L.T. Truong
(74) *Attorney, Agent, or Firm* — Walter W. Duft

(57) ABSTRACT

A cluster recovery and maintenance technique for a server cluster having plural nodes implementing a server tier in a client-server computing architecture. A first group of N active nodes each run a software stack comprising a cluster management tier and a cluster application tier that actively provides services on behalf of one or more client applications running in a client application tier on the clients. A second group of M spare nodes each run a software stack comprising a cluster management tier and a cluster application tier that does not actively provide client application services. First and second zones in the cluster are determined in response to an active node membership change involving one or more active nodes departing from or being added to the first group as a result of an active node failing or becoming unreachable or as a result of a maintenance operation involving an active node.

11 Claims, 7 Drawing Sheets

U.S. PATENT DOCUMENTS

| | | |
|---|---|---|
| 7,870,425 B2 * | 1/2011 | Moore et al. .................... 714/13 |
| 7,925,932 B1 | 4/2011 | Shah |
| 8,108,733 B2 * | 1/2012 | Richmond .................... 714/43 |
| 2002/0046365 A1 | 4/2002 | Avizienis |
| 2002/0073354 A1 * | 6/2002 | Schroiff et al. .................... 714/4 |
| 2002/0162050 A1 | 10/2002 | Milojicic et al. |
| 2003/0051187 A1 * | 3/2003 | Mashayekhi et al. ............. 714/4 |
| 2003/0079154 A1 | 4/2003 | Park et al. |
| 2003/0158933 A1 | 8/2003 | Smith |
| 2004/0059735 A1 | 3/2004 | Gold et al. |
| 2004/0088523 A1 | 5/2004 | Kessler et al. |
| 2004/0128587 A1 | 7/2004 | Kenchammana-Hosekote et al. |
| 2004/0199811 A1 | 10/2004 | Rathunde et al. |
| 2004/0205414 A1 | 10/2004 | Roselli et al. |
| 2004/0243650 A1 | 12/2004 | McCrory et al. |
| 2004/0260809 A1 | 12/2004 | Yodaiken |
| 2005/0108593 A1 | 5/2005 | Purushothaman et al. |
| 2005/0187891 A1 | 8/2005 | Johnson et al. |
| 2005/0228947 A1 * | 10/2005 | Morita et al. ................. 711/114 |
| 2005/0246569 A1 | 11/2005 | Ballew et al. |
| 2006/0053337 A1 | 3/2006 | Pomaranski et al. |
| 2006/0080568 A1 * | 4/2006 | Subbaraman et al. ............ 714/4 |
| 2006/0098558 A1 | 5/2006 | Kobayashi et al. |
| 2006/0126501 A1 | 6/2006 | Ramaswamy |
| 2006/0155912 A1 | 7/2006 | Singh et al. |
| 2009/0024868 A1 * | 1/2009 | Joshi et al. ....................... 714/4 |

FOREIGN PATENT DOCUMENTS

| | | |
|---|---|---|
| TW | 200511002 A | 3/2005 |
| TW | 200513870 A | 4/2005 |

* cited by examiner

FAULT-TOLERANCE AND FAULT-CONTAINMENT MODELS FOR ZONING CLUSTERED APPLICATION SILOS INTO CONTINUOUS AVAILABILITY AND HIGH AVAILABILITY ZONES IN CLUSTERED SYSTEMS DURING RECOVERY AND MAINTENANCE

This application is a continuation under 35 U.S.C. 120 of application Ser. No. 11/170,331, filed Jun. 29, 2005, entitled "Fault-Tolerance And Fault-Containment Models for Zoning Clustered Application Silos Into Continuous Availability And High Availability Zones In Clustered Systems During Recovery And Maintenance."

BACKGROUND OF THE INVENTION

1. Field of the Invention

The present invention relates to computer clusters and methods for cluster application recovery. More particularly, the invention concerns a recovery technique for improving cluster application availability during cluster recovery processing.

2. Description of the Prior Art

By way of background, managed data processing clusters are commonly used to implement the server tier in a client-server architecture. Instead of a single server providing application services to clients, application service functions are shared by an interconnected network of nodes (server cluster) operating cooperatively under the control of cluster management software. Responsibilities of the cluster management software commonly include the coordination of cluster group membership changes, fault monitoring and detection, and providing the server node application layers with distributed synchronization points. These cluster support functions allow the servers to implement a cohesive cluster application tier that provides a clustered service. Clustered services are advantageous because plural nodes can share application workloads and thus improve data processing performance as well as application availability. Exemplary applications that can run in a server cluster include network file systems, distributed databases, web servers, email servers, and many others.

Cluster architectures tend to use either a symmetric model wherein every node can service any application request, or they use an asymmetric/partitioned model wherein the application space is statically or dynamically partitioned across the cluster. According to the symmetric model, every node is homogeneous relative to the application services that the cluster provides, and there is no partitioning of the application space. Every node can process any request from clients of the clustered application. According to the partitioned model, there is static or dynamic partitioning of the application space (sometimes referred to as N-way logical partitioning), with each node servicing requests for the partition(s) that it owns.

Regardless of whether a cluster follows the symmetrical or partitioned model, the loss of a cluster node will not ordinarily bring down its applications or application partitions because the cluster management software can transfer the lost server's functions to another node. Nonetheless, the failure of a cluster node (or a communication link between nodes) is disruptive to cluster operations. When such failures occur, a process known as cluster recovery is initiated in order to restore the application functionality that was lost as a result of the failure. Unless the cluster architecture is fault tolerant, the cluster recovery procedure will nearly always result in a temporary interruption of an entire clustered application that spans the time period from fault detection until cluster recovery and application recovery completes. This cessation of application processing adversely affects application clients, including those connected to surviving nodes of the cluster. As such, near-continuous or even continuous application availability requirements are being increasingly placed on the recovery characteristics of cluster architecture-based products.

In general, the total duration of cluster recovery stems from some or all of the following activities associated with the recovery procedure:

1) Failure detection and validation;
2) Cluster recovery via synchronized cluster membership view updates;
3) Fencing of failed nodes (to halt application I/O operations);
4) Application partition failover (for logical partitioned architectures only);
5) Recovery of write-ahead logs; and
6) Application request re-routing.

That the foregoing recovery steps should result in cluster application disruption for the entire cluster recovery period is a direct result of the way traditional cluster management systems and cluster applications work. In particular, the integrity of cluster application transactional processing is premised on the cluster management software guaranteeing the integrity of the cluster and the application data. Because cluster integrity cannot be guaranteed in its entirety during cluster recovery, and because data integrity cannot be guaranteed until after fencing, failover, and write-ahead log recovery, traditional clustered application systems choose to pause all transaction activity during the total recovery period. Consistent with this design approach, most of the effort to improve cluster recovery to date has focused on reducing the duration of the individual steps that contribute to the total recovery time.

With respect to fault detection and validation, this time period can be reduced by implementing multiple redundant monitoring topologies to provide multiple data points for fault detection. For example, dual ring or triple ring heartbeat-based monitoring topologies (that require or exploit dual networks, for instance) can reduce failure detection time markedly. However, this approach has no impact on cluster or application recovery processing itself. The architecture also increases the cost of the clustered application.

With respect to cluster membership view updates (during cluster recovery), there is not much that can be done insofar as cluster management architectures are typically designed to serialize cluster recovery protocols and intra-cluster messaging protocols (the former pertaining to cluster recovery; the latter arising from application activity). As a result, no application activity can take place until the high priority cluster recovery protocol concludes. This by definition forces a cluster-wide pause or disruption in service.

With respect to the fencing of failed nodes and application partition failover, there is no associated cost if the cluster implements a symmetrical application architecture because client requests can simply be directed to another node. In the partitioned model, however, there is static or dynamic partitioning of the application space, with each node servicing requests for the partition(s) that it owns. In this architecture, the cost of application recovery will always include the cost of fencing and partition failover and thus bears an increased cost for application recovery in comparison to the symmetric model. Synchronous logging (as opposed to asynchronous write-ahead logs) or aggressive buffer cache flushing can be used to help reduce the failover cost, but both solutions affect steady state performance.

With respect to log-based recovery and application request re-routing, many cluster systems use a journaled/log architecture (e.g., databases, file systems) that determines the inherent log-based recovery characteristics as well as the continuity of application transactions. Typically, each node in a static or dynamic partitioning model uses a single write-ahead log (WAL) for all application partitions served by that node. In order to failover a partition from a failed node to a live node, the write-ahead log on the live node must first be truncated, which entails flushing the buffer cache as well as writing out the log pages to disk. Using a log architecture that maps the write-ahead log one-to-one to a logical partition of the application (as opposed to mapping it one-to-one with a node in the cluster) would provide greater transactional isolation between unaffected application partitions and affected partitions. As a result, there would be greater transactional continuity on unaffected partitions and shorter log-based recovery time for affected partitions. As used herein, the term "unaffected partition" refers to any partition that runs on a live (non-failed) node. In contrast, an "affected partition" is a partition that was being serviced by a node that has become unreachable (e.g., due to a fault, scheduled maintenance, or any other reason). The failover of an affected partition to a live node whose unaffected partition(s) have their own write-ahead log mappings will not affect such logs. A new write-ahead log will simply be created for the partition being failed over to the live node. However, implementing this type of log architecture would require a major re-write of many cluster application products and may not be practical. Nor would such an architecture scale well with a large number of partitions (in terms of storage space needed).

There are storage appliances that use hardware architectures with built in redundant access to the write-ahead log buffer in memory and the write-ahead log on disk. These systems naturally follow fault-tolerance principles rather than recovery-based models for high availability by using a synchronous log replication scheme between pairs of nodes. This allows a sibling node to take over from where a failed node left off. However, although synchronous log replication works very well in an active-active high availability solution, it is difficult to generalize the model for clusters without pairing nodes for synchronous log replication. This adds significantly to cost as well as complexity.

SUMMARY OF THE INVENTION

The foregoing problems are solved and an advance in the art is obtained by a novel cluster recovery and maintenance system, method and computer program product for use in a server cluster having plural nodes implementing a server tier in a client-server computing architecture. A first group of N active nodes each run a software stack comprising a cluster management tier and a cluster application tier that actively provides services on behalf of one or more client applications running in a client application tier on the clients. A second group of M spare nodes each run a software stack comprising a cluster management tier and a cluster application tier that does not actively provide services on behalf of client applications. First and second zones in the cluster are determined in response to an active node membership change involving one or more active nodes departing from or being added to the first group as a result of an active node failing or becoming unreachable or as a result of a maintenance operation involving an active node. The first zone is a fault tolerant zone comprising all operational active nodes. The second zone is a fault containment zone comprising all active nodes participating in the membership change and at least a corresponding number of spare nodes to the extent that the membership change involves a node departure. During cluster recovery and maintenance, fast recovery/maintenance and high application availability are implemented in the fault containment zone, while continuous application availability is maintained in the fault tolerant zone.

The foregoing is achieved by maintaining transactional isolation between the fault tolerant group and the fault containment group, and by maintaining transactional continuity in the fault tolerant zone. Transactional isolation is achieved by failing over the client application services provided by unreachable or removed node(s) in the fault containment group to a corresponding number of spare nodes in the fault containment group. Because the spare nodes do not provide transaction services prior to failover, there is no impact on transaction processing on any active node. For newly added nodes, these will either become new spare nodes or they will become new active nodes. If the latter, the assignment of application workloads to such nodes will not affect transaction processing in the fault tolerant zone. Transactional continuity in the fault tolerant zone is achieved by guaranteeing cluster membership integrity in that zone and ensuring the continued viability of application-driven pre-recovery communication sessions for intra-cluster messages that enable transactional continuity of the application. Cluster membership integrity in the fault tolerant zone is guaranteed by monitoring fault-tolerant zone node health and transitioning any node that suffers a low-probability recovery-time failure to the fault-containment zone, thereby ensuring continuous availability in the fault-tolerant zone. Node monitoring in the fault tolerant zone can be advantageously performed by leveraging the normal request/response-based cluster recovery communication protocol that proceeds cluster-wide during recovery. Upon a failure to receive a node response in the fault-tolerant zone, the group membership size in the fault tolerant zone can be reduced by marking the non-responsive node as failed, thus ensuring recovery protocol convergence. Protocol oscillation can be prevented by denying group re-admittance to nodes marked as failed, unless such nodes rejoin using a standard join protocol. The viability of pre-recovery communication sessions can be ensured by using absolute node identifiers that do not change with group membership size and retention of communication session data structures.

Transactional continuity in the fault tolerant zone can be further assisted by appropriate scoping of the concurrent cluster communication protocols. Application recovery protocols are limited to the cluster application and cluster management tiers of the fault containment group. Normal transactional application protocols are limited to the cluster application and cluster management tiers of the fault tolerant group. Cluster recovery protocols proceed in the cluster management tier of both the fault tolerant group and the fault containment group.

BRIEF DESCRIPTION OF THE DRAWINGS

The foregoing and other features and advantages of the invention will be apparent from the following more particular description of exemplary embodiments of the invention, as illustrated in the accompanying drawings, in which.

DETAILED DESCRIPTION OF EXEMPLARY EMBODIMENTS

I. Introduction

Figure 1:
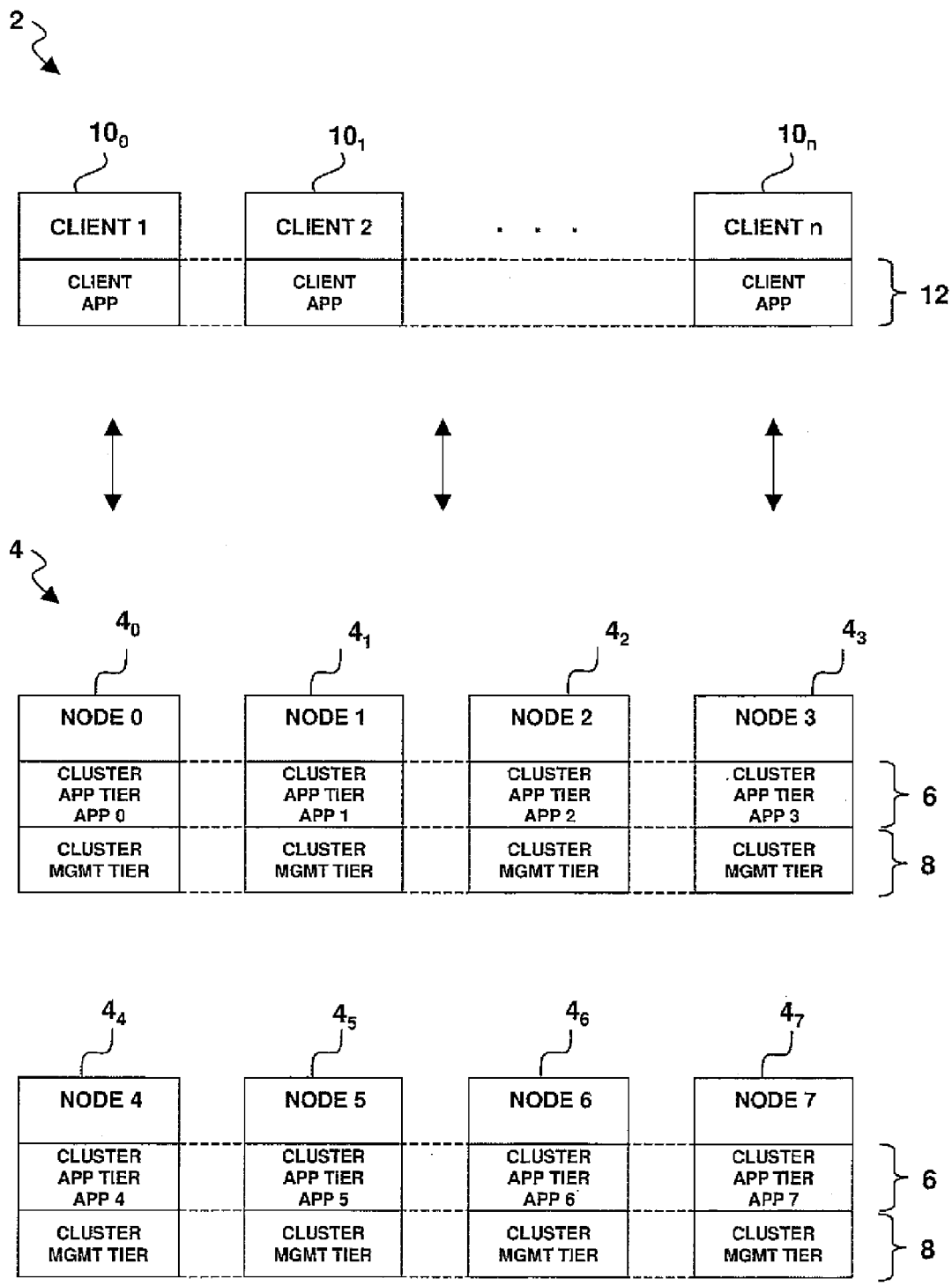
FIG. 1 is a functional block diagram showing a client-server computing architecture in which the server tier is implemented by way of a cluster that is adapted to perform cluster recovery in accordance with the present invention.

Turning now to the drawing figures wherein like reference numbers indicate like elements in all of the several views, FIG. 1 illustrates a client-server computing architecture 2 wherein the server tier is provided by a server cluster 4. For purposes of illustration only, and not by way of limitation, the server cluster 4 is implemented as a network (network interconnections not shown) that comprises eight server nodes designated by reference numerals $4_0, 4_1, 4_2, 4_3, 4_4, 4_5, 4_6$, and $4_7$. The server nodes $4_0$-$4_7$ are computer platforms that run a software stack comprising two tiers, namely, a cluster application tier 6 and a cluster management tier 8. The cluster application tier 6 comprises software that implements a clustered server application providing clustered services on behalf of an arbitrary number of client nodes designated by reference numerals $10_0, 10_1 \ldots 10_n$. The clients $10_0, 10_1 \ldots 10_n$ run client application software within a client application tier 12. The client nodes $10_0, 10_1 \ldots 10_n$ may communicate with the server nodes $4_0$-$4_7$ by way of any suitable communication interface. For example, there could be a single client-server network (not shown) in which all client nodes are able to communicate with all server nodes. Alternatively, there could be several client-server networks (not shown) wherein subsets of client nodes communicate with subsets of server nodes. A further alternative would be to provide a plurality of individual communication links (not shown) wherein each client node communicates with a single server node.

The cluster application tier software 6 run by the server nodes $4_0$-$4_7$ can include application partitions that are each unique to a single server node, thereby providing an N-way logical partitioning architecture. Alternatively, the cluster application tier software 6 could include homogeneous application instances running on plural server nodes to provide a symmetric cluster architecture. For purposes of illustration only, and not by way of limitation, FIG. 1 illustrates a scenario wherein each server node $4_0$-$4_7$ respectively runs a unique cluster application partition. These software entities are respectively designated as App 0, App 1, App 2, App 3, App 4, App 5, App 6, and App 7, with the application partition number corresponding to the server node number on which it runs. Although not shown, it would also be possible for several application partitions to run on a single server node, in which case the designations App 0 et seq. could respectively refer to more than just one partition.

The cluster application tier software 6 interacts with the cluster management tier software 8 on the server nodes $4_0$-$4_7$ so that the application partitions in the cluster application tier can behave as a clustered service. To that end, the cluster management tier software 8 conventionally provides the cluster application tier software 6 with distributed synchronization points and other services. The cluster management tier 8 is also responsible for performing cluster maintenance and integrity functions such as the coordination of cluster group membership changes, together with fault monitoring and detection. Moreover, as described in more detail below in connection with FIG. 4 et seq., the cluster management tier software 8 also implements recovery operations in accordance with the invention.

Figure 2:
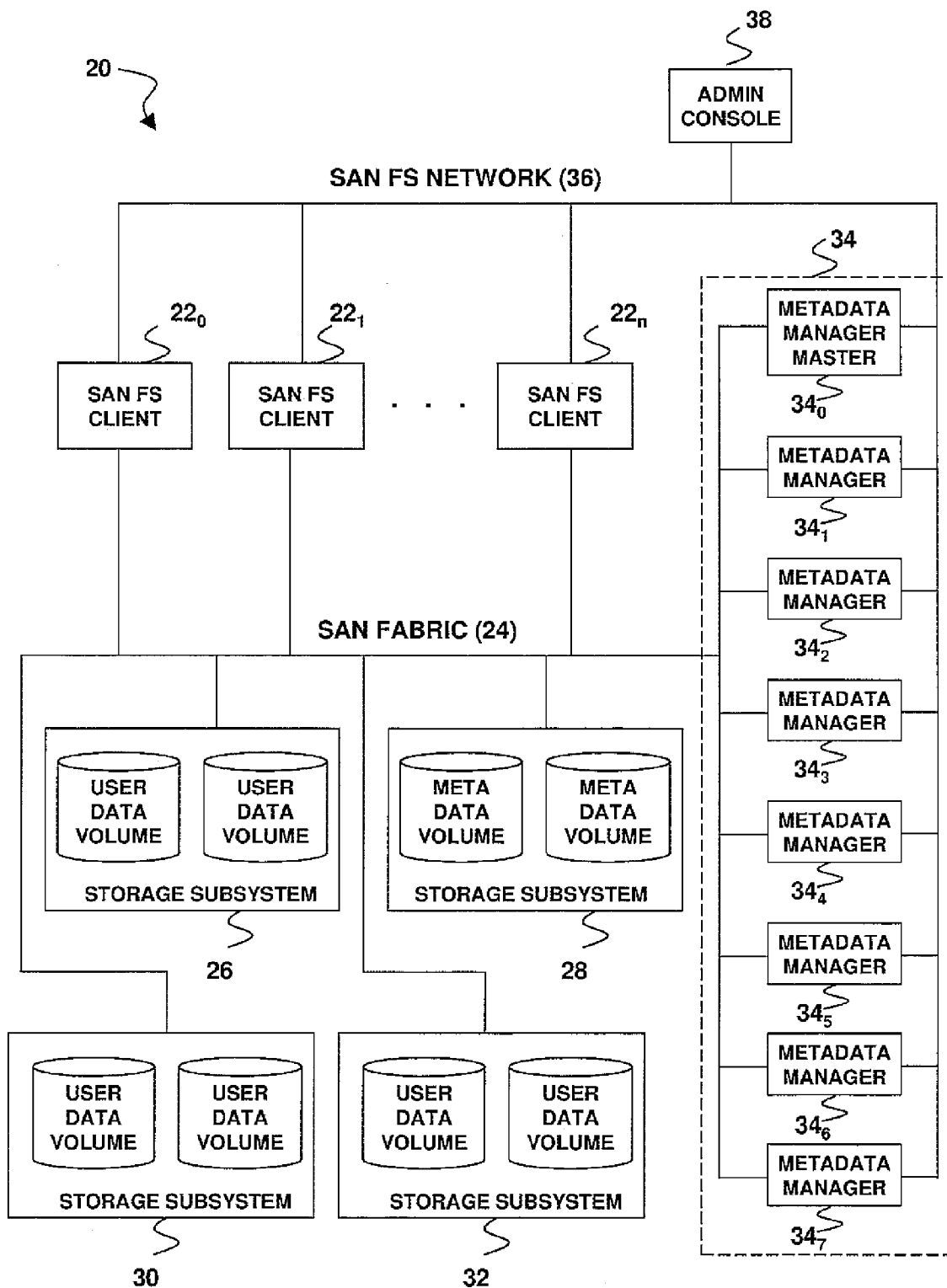
FIG. 2 is a functional block diagram showing an exemplary implementation of the client-server computing architecture of FIG. 1 in a storage area network implementing a distributed file system.

Turning now to FIG. 2, an exemplary environment in which the client-server computing architecture 2 of FIG. 1 may be implemented is shown. In particular, FIG. 2 illustrates a Storage Area Network (SAN) 20 in which plural SAN file system clients $22_0, 22_1 \ldots 22_n$ are interconnected by way of a SAN fabric 24 to a system storage pool comprising (by way of example only) four storage subsystems 26, 28, 30 and 32. A server cluster 34 (corresponding to the server cluster 4 of FIG. 1) is used to support distributed file system operations in the SAN 20. As is known in the data storage art, the goal of a distributed file system in a SAN environment is to provide such benefits as a global namespace for files regardless of where they are stored, shared access from any file system client to any storage device, and centralized, policy-based management. One commercial product that provides a SAN-based distributed file system is the IBM® TotalStorage® SAN File System. This product implements out-of-band storage virtualization wherein file metadata (e.g., file names, attributes, permissions, etc.) are stored in a different location than the file blocks that represent user data. In FIG. 2, the server cluster 34 comprises eight meta-data managers $34_0, 34_1, 34_2, 34_3, 34_4, 34_5, 34_6$, and $34_7$ (corresponding to the server nodes $4_0$-$4_7$ of FIG. 1) that handle file metadata on behalf of the file system clients $22_0, 22_1 \ldots 22_n$. This metadata is shown in FIG. 2 to be stored in two metadata volumes situated on the storage subsystem 28. The metadata managers $34_0$-$34_7$ communicate with the file system client servers $22_0, 22_1 \ldots 22_n$ via network 36, using TCP/IP packet communication or the like.

During data retrieval operations in the SAN 20, the meta-data managers $34_0$-$34_7$ processes metadata requests from client tier applications running on the file system clients $22_0, 22_1 \ldots 22_n$ that invoke metadata manager server functions. Thus, when one of the file system clients $22_0, 22_1 \ldots 22_n$ needs to transfer file data to or from one of the storage subsystems 26, 30 or 32 that holds user data, it queries one of the metadata managers $34_0$-$34_7$ to determine the file's location and other control information. Once this information is returned to the requesting file system client $22_1, 22_2 \ldots 22_n$, and it obtains appropriate locks on the file, the file system client can perform the required data transfer operation without further intervention by the metadata managers $34_0$-$34_7$.

In a distributed file system product such as the IBM® TotalStorage® SAN File System, each metadata manager $34_0$-$34_7$ typically performs metadata operations relative to some assigned portion of the distributed file system namespace. Each metadata manager $34_0$-$34_7$ may thus be thought of as running a separate metadata cluster application partition, and these application partitions can be analogized to the cluster application partitions labeled App 0 . . . App 7 in FIG. 1. Any file system client $22_0, 22_1 \ldots 22_n$ that needs to access a file will be directed to the metadata manager $34_0$-$34_7$ that is responsible for the portion of the file system namespace sub-tree that corresponds to the specified file name. As such, the IBM® TotalStorage® SAN File System implements an N-way logical partitioning architecture.

Another feature of the IBM® TotalStorage® SAN File System is that one of the metadata managers $34_0$-$34_7$ will be assigned to function as a master metadata manager. In FIG. 2, this is the metadata manager $34_0$. Any of the other metadata managers $34_1$-$34_7$ could likewise function as the master (the designation of manager $34_0$ being arbitrary), or they could be selected to replace the metadata manager $34_0$ if it failed. The master metadata manager $34_0$ is a cluster leader or coordinator that is responsible for cluster management, including the assignment of distributed file system namespace responsibilities to other metadata managers $34_1$-$34_7$, and the failover of metadata server functions from a failed metadata manager to one or more of its peers. The master metadata manager $34_0$ also provides a metadata management administrative interface that can be accessed by way of the administrative console 38 in FIG. 2.

In the context of FIGS. 1 and 2, if a cluster server node becomes unreachable during cluster operations due to a fault or other condition, or if a node is removed for maintenance, or if a new node is added, cluster recovery or maintenance should be performed with minimal impact on client applications. The present invention advantageously achieves this goal. It provides an architecture that can be implemented in general purpose clusters to impart fault-tolerance by ensuring continuous availability for much of a cluster application, while minimizing disruption for the affected parts of the application upon the occurrence of a fault or during scheduled maintenance. With respect to application availability and recovery/maintenance, this allows general purpose clusters to be taken from the realm of high (99.9%-99.99%) availability to continuous (99.995%-99.999%) availability, which was until now considered the domain of fault-tolerant systems. Although these advantages are most pronounced in logical partitioned clusters, the same advantages are provided for symmetrical clusters. For ease of reference, and unless the context specifically requires, all subsequent use of the term "cluster application" will be understood to encompass both a cluster application partition according to a logical partitioning cluster model and a homogeneous cluster application instance according to a symmetrical cluster model.

The foregoing goals are achieved using a containment technique based on an N+M redundancy cluster model for up to M faults in a cluster of size N (N>M). This is shown by way of FIG. 3, which shows a software view of the eight node cluster 4 according to FIG. 1. The lowest level of the software stack is the server node-implemented cluster management tier 8. Above the cluster management tier 8 is the server node-implemented cluster application tier 6. Above the cluster application tier 6 is the client node-implemented application tier 12. Each thin vertical section above the cluster management tier 8 represents a single cluster application instance running on a single server node, together with corresponding client application instances (three are shown in each vertical section) running on various client nodes. Thus constituted, each thin vertical section is referred to as an application silo.

Figure 3:
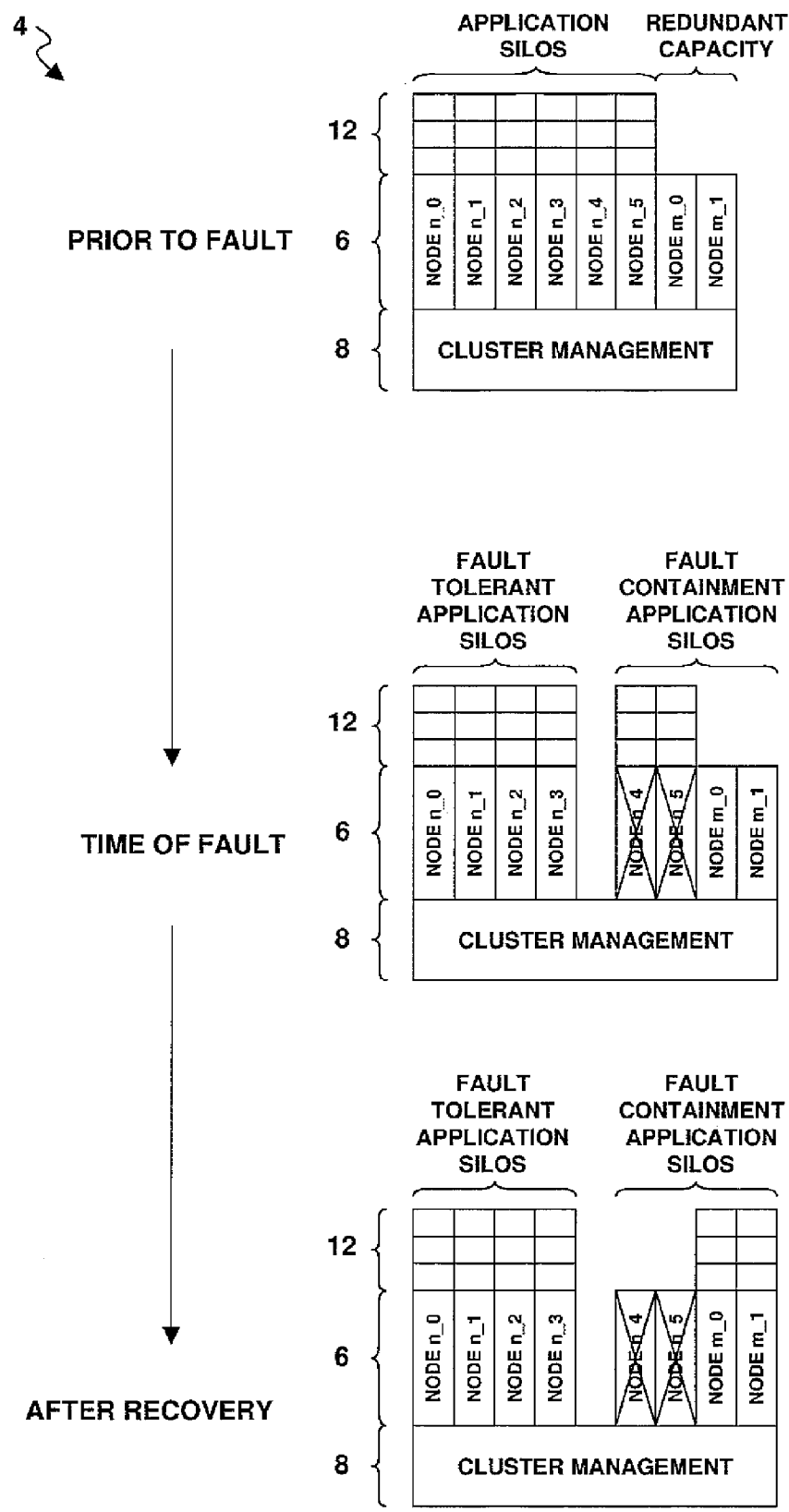
FIG. 3 is an exemplary logical view of the cluster of FIG. 1, prior, during and after a fault.

The top-most portion of FIG. 3 is a view presented by the above-described software stack prior to a fault. According to the assumed N+M redundancy model, there is a first group of N active nodes (n_0, n_1, n_2, n_3, n_4 and n_5) that each run a software stack comprising the cluster management tier 8 and the cluster application tier 6, with the latter actively providing services on behalf of one or more client applications running in the client application tier 12 of one or more clients (the application silo). A second group of M spare nodes (m_0 and m_1) are provided that each run a software stack comprising the cluster management tier 8 and the cluster application tier 6, with the latter not actively providing services on behalf of client applications. The spare nodes m_0 and m_1 run the entire cluster management and cluster application software stack, but are not to be assigned partitions to service (in logical partitioned clusters), and application requests are not forwarded to those nodes (in symmetric clusters). As such, there are no application silos associated with the m_0 and m_1 nodes. Instead, these nodes that are without client application tiers represent the redundant or spare capacity in the system. Although they run the cluster management tier and cluster application tier software, they will have no real cluster application work until failover occurs.

II. Cluster Recovery

In response to one or more of the active nodes (n_0-n_5) becoming unreachable due to a fault, a cluster leader (such as the metadata manager master $34_0$ of FIG. 2) virtually creates first and second zones in the cluster (e.g., as by logically defining the zones). The first zone is a fault tolerant zone comprising all active nodes that remain operational (fault tolerant group). The second zone is a fault containment zone comprising the unreachable node(s) and at least a corresponding number of the spare nodes (fault containment group). An example of such zoning is shown in the middle portion of FIG. 3. Here, a fault has occurred in nodes n_4 and n 5. The fault tolerant zone comprises the core group of surviving nodes, namely n_0, n_1, n2 and n3. The fault containment zone comprises the failure group n_4 and n_5 together with the spare-node group comprising m_0 and m_1. Note that if there were additional spare nodes, they could be incorporated into the fault containment group, or they could be left out. In the former case, the fault containment group is defined as the union of all nonreachable nodes and all spare nodes. In the latter case, the fault containment group comprises all unreachable nodes and an equal number of spare nodes.

During cluster recovery, fast recovery and high cluster application availability are implemented in the fault containment zone, while continuous cluster application availability is maintained in the fault tolerant zone. The application silos associated with the unreachable nodes will thus be quickly brought back on line, and the application silos associated with the remaining active nodes will continue unabated and completely unaware that cluster recovery is underway.

The ability to implement fast recovery and high cluster application availability in the fault containment zone is achieved by maintaining transactional isolation between the fault tolerant group and the fault containment group. As shown in the bottom portion of FIG. 3, transactional isolation is maintained by using a failover model in which the cluster leader causes the client application services provided by the cluster applications of unreachable node(s) n_4 and n_5 in the fault containment group to be failed over to the spare nodes m_0 and m_1 in that group. Because the spare nodes do not provide transaction services prior to failover, there is no impact on transaction processing on any active node. By contrast, in prior art N-way cluster systems, the transaction services of a faulty node are typically failed over to other active nodes. This means that all critical transaction processing entities on those nodes, such as buffer management components, write-ahead logs, and their associated data structures and transaction primitives, which are usually shared by all cluster applications that run on a given node, need to be stopped, check-pointed and truncated. Then, the transactional volume of the non-reachable nodes needs to be incorporated into the corresponding failover nodes. As a result, cluster recovery in prior art cluster systems almost always caused a pause in transactional service. According to the present invention, there are no transaction components running on the spare nodes $m\_0$ and $m\_1$ that could affect any active application silos in the fault tolerant group, such that transactional isolation is maintained. Thus, even though only one write-ahead log may be used per node for any number of cluster applications served on a node, the cost of failover is minimized by using the N+M redundancy and failover model. Relatedly, the failover procedure will progress very rapidly in the fault containment group insofar as none of the aforementioned synchronization needs to be performed. The only requirement is that there be sufficient spare capacity to transfer application service processing functions from the unreachable nodes to the spare nodes. Using the inventive technique, a fault in 1 or up to M nodes will be contained within $2m$ nodes, where $0<m<M$ and is the number of concurrent faults.

Maintaining transactional isolation also helps ensure that continuous cluster application availability is maintained in the fault tolerant zone. In particular, containing failover operations to the fault containment group means that transaction processing in the fault tolerant group may continue without regard to the failover procedure. Another aspect of maintaining continuous application availability in the fault tolerant zone is to provide transactional continuity in the fault tolerant zone during cluster recovery. The cluster leader achieves this by monitoring the nodes in the fault-tolerant zone and guaranteeing cluster membership integrity of the fault tolerant zone, together with ensuring the continued viability of pre-recovery communication sessions. The former is important because cluster systems normally cannot continue with transaction processing during recovery due to the fact that cluster integrity is not guaranteed when a cluster recovery protocol is in progress (as a result of a cluster node becoming unreachable or faulty). When cluster integrity cannot be guaranteed, transactional messages from client applications will either be buffered during cluster recovery, or the client applications will be requested to resend their messages following recovery. Transactional continuity thus requires that all critical client application and intra-cluster messaging continue unhindered. According to the present invention, when the cluster suffers a fault, the fault tolerant zone transparently participates in the cluster recovery but continues its intra-cluster messaging for client application transactions unhindered.

Figure 4:
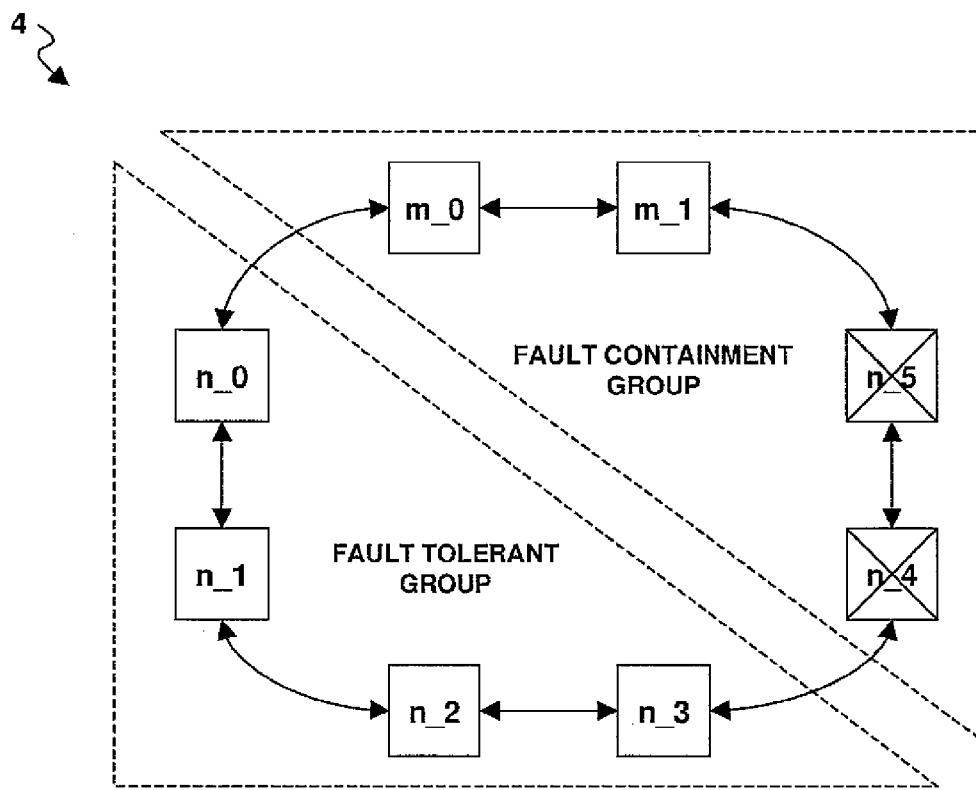
FIG. 4 is a functional block diagram showing an exemplary form of topology monitoring in the cluster of FIG. 1 prior to cluster recovery.
Figure 5:
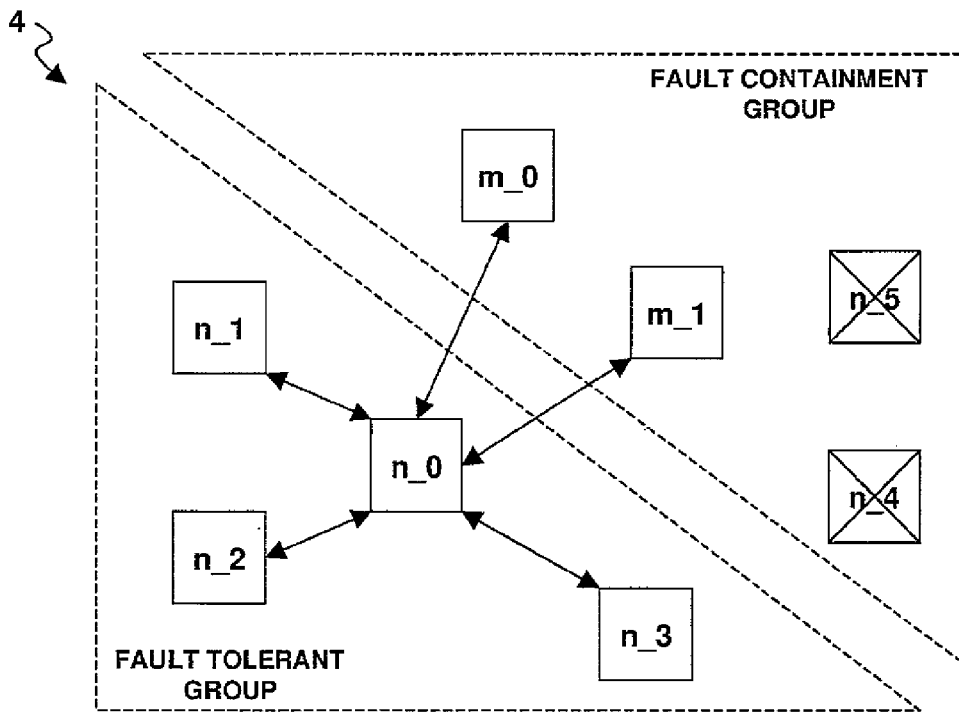
FIG. 5 is a functional block diagram showing an exemplary form of topology monitoring in the cluster of FIG. 1 during cluster recovery.

Turning now to FIGS. 4 and 5, cluster integrity is typically guaranteed during steady state operations (i.e., prior to cluster recovery) by virtue of maintaining a valid cluster membership view and a heartbeat-based ring monitoring topology that detects any loss of integrity due to a node becoming unreachable. When one or more faults occur, say in nodes $n\_4$ and $n\_5$ as shown in FIG. 4, the cluster will comprise three distinct subsets: a core group of surviving nodes comprising $n\_0, n\_1, n\_2$ and n3, a failure group comprising nodes $n\_4$ and $n\_5$, and a spare-node group comprising nodes $m\_0$ and $m\_1$. At the time of a fault and during recovery, cluster members of the fault-tolerant group are identified as such by the cluster leader. For purposes of illustration only, the cluster leader in FIGS. 4 and 5 is assumed to be node $n\_0$. As long as each individual cluster member in the fault tolerant zone stays connected with the cluster leader, and its view of the fault-tolerant zone (which is a subgroup of the cluster) is not altered in any way, the cluster member will continue to operate transparently as a fault-tolerant group member. In contrast, a node that has suffered a fault or is a spare node exists as such in the fault-containment group and waits to be directed by the cluster leader.

Cluster membership integrity can be guaranteed in the fault-tolerant zone by leveraging the normal request/response communication technique that is performed cluster-wide during cluster recovery. This highly reliable cluster recovery protocol technique involves a membership view update as a distributed commit protocol across the entire cluster encompassing both zones. Using multicast, broadcast or serial unicast methods, the cluster leader sends messages to the other nodes of the cluster to quiesce transaction activity, reform the cluster and perform a membership update, then resume transaction activity. The cluster leader's message corresponds to a "request" (or send) and the response of cluster members corresponds to a "response" (or receive). As shown by the star monitoring topology of FIG. 5, the cluster leader keeps track of acknowledgements received in response to the request messages sent to the cluster members. Although conventionally used in existing cluster management systems, this protocol is advantageously leveraged by the present invention to monitor the surviving nodes in the fault-tolerant zone without introducing any new protocol. There is no need for new cluster recovery messaging in the fault tolerant zone. Instead, the cluster leader is programmed to interpret the lack of a response acknowledgement from a surviving node of the fault tolerant zone (within a specified timeout period) as node failure. This will prompt the cluster leader to designate the unresponsive node as being offline. Node membership in the fault tolerant zone can thus be continuously monitored by the cluster leader as cluster recovery proceeds. Advantageously, the request/response cluster recovery communication protocol is implemented within the cluster management tier of the cluster members, and this protocol proceeds transparently and concurrently with cluster application tier functions in the fault tolerant group, so that the latter are never disrupted during cluster recovery.

Transactional integrity in the fault-tolerant group depends on fault-tolerant group integrity. If the cluster leader suffers a fault, then by definition no fault-tolerant group can exist because the cluster leader's cluster management functions are lost. But so long as the cluster leader is operational, the fault-tolerant group integrity can be guaranteed at all times even though the fault-tolerant group composition may change. In the unlikely event of a concurrent fault of a node in the fault tolerant zone during cluster recovery, the cluster leader will transition the failed node to the fault-containment zone, either during the same protocol or by a subsequent cluster recovery protocol. For example, assume node $n\_2$ in FIG. 5 fails and the integrity of nodes $n\_0, n\_1, n\_2$ and $n\_3$ is temporarily lost late during the recovery protocol. The cluster leader ($n\_0$) can re-initiate the cluster recovery protocol after reducing the fault-tolerant group by one, such that the fault-tolerant group composition becomes $n\_0, n\_1$ and $n\_3$. The cluster leader will thereafter maintain fault-tolerant group integrity based on the new scope. By way of further example, assume that node $n\_3$ in FIG. 5 is lost early in the recovery protocol. In that case, the cluster leader ($n\_0$) may eliminate $n\_3$ from the fault-tolerant zone within the same recovery protocol. Using the foregoing techniques, the fault-tolerant group composition may float (in terms of members leaving the group), so long as fault tolerance is provided to surviving members. This guarantees recovery protocol convergence because the cluster recovery protocol can be re-initiated only up to N−1 times (the size of the maximal fault-tolerant group minus 1).

Protocol oscillation in the fault tolerant zone can be prevented by denying group re-admittance to nodes marked as failed, unless such nodes rejoin using a standard join protocol. In the example above, node n_2 is not allowed to implicitly join the cluster during cluster recovery when it was already determined to have been failed in a previous iteration of the protocol.

The viability of pre-recovery communication sessions between nodes in the fault-tolerant zone can be ensured by using absolute node identifiers that do not change with group membership size as well as by retaining all communication session data structures and context. All messaging sessions are typically bound to session end-points that are determined not only by node IP-address:port but are also addressable by node-id. Many cluster systems re-issue node identifiers after cluster reformation or recovery. In contrast, the present invention implements absolute and unique node identifiers to ensure that the communication sessions between nodes are independent of cluster membership changes and cluster recovery protocols. To implement the foregoing, a persistent counter of 32 bits (or other suitable size) can be used that will support the generation of a suitable number (e.g., up to 4G) unique node identifiers (until wrap-around occurs).

Transactional continuity in the fault tolerant zone is further assisted by way of the cluster leader orchestrating concurrent protocol scoping. Application recovery protocols are limited to the cluster application and cluster management tiers of the fault containment group. Active cluster messaging protocols arising from transactional application protocols are limited to the cluster application and cluster management tiers of the fault tolerant group. Cluster recovery protocols are limited to the cluster management tier of both the fault tolerant group and the fault containment group. As previously stated, the invention also leverages the normal request/response cluster recovery communication protocol to monitor the nodes in the fault-tolerant zone without introducing any new protocol, such that there is no new cluster recovery messaging taking place in the fault tolerant zone. The only additional messaging in this zone is the application protocol-influenced intra-cluster messaging, which ordinarily would be paused during cluster recovery in a conventional system.

Figure 6:
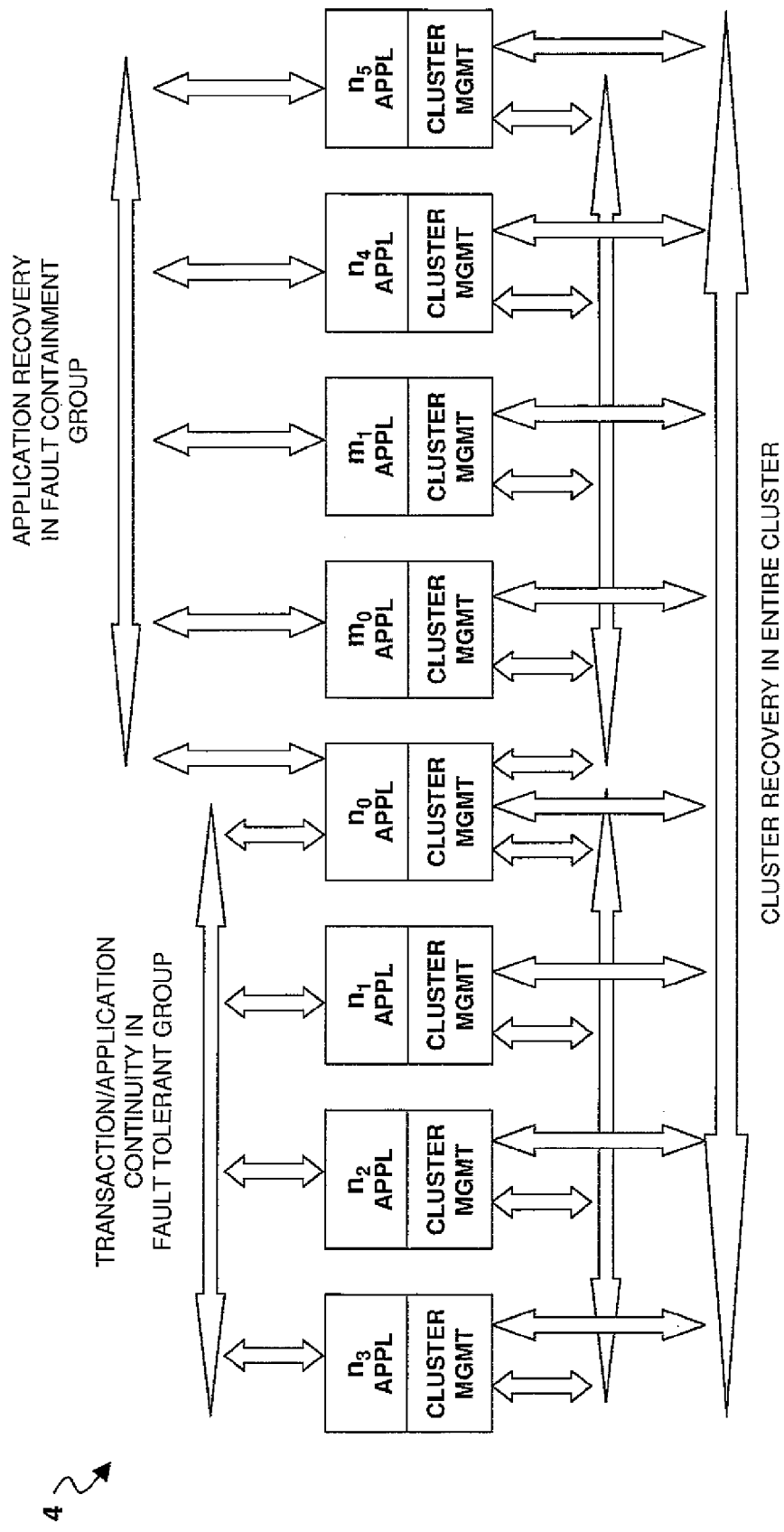
FIG. 6 is a functional block diagram showing how transactional isolation, communication continuity, and consequently, transactional continuity are maintained in the cluster of FIG. 1 following cluster recovery.

FIG. 6 illustrates the foregoing concurrent protocol scoping during cluster recovery in the fault-tolerant and fault containment zones. The protocol flow labeled "Application Recovery In Fault Containment Group" depicts application recovery protocols. These protocols are depicted as virtual messages in the cluster application tier of the fault containment group and are encapsulated as real messages in the cluster management tier of the fault containment group. The protocol flow labeled "Transaction/Application Continuity In Fault Tolerant Group" depicts transactional application protocols and corresponding active intra-cluster messaging protocols. These protocols are depicted as virtual messages in the cluster application tier of the fault tolerant group and are encapsulated as real messages in the cluster management tier of the fault tolerant group. The protocol flow labeled "Cluster Recover in Entire Cluster" depicts the cluster recovery protocol. This protocol is implemented by the cluster management tier in both the fault tolerant and fault containment groups.

The faults and impact of recovery and failover are thus contained within the 2M nodes of the fault-containment group in the cluster, namely, the M failed nodes and corresponding M spare or redundant nodes. The cluster recovery protocol affects the cluster management tier of all N+M nodes, but affects the cluster application tier of only the 2M+1 (the +1 is for the cluster leader) nodes that participate in failing over the client service partitions from the M failed nodes to M spare nodes.

Figure 7:
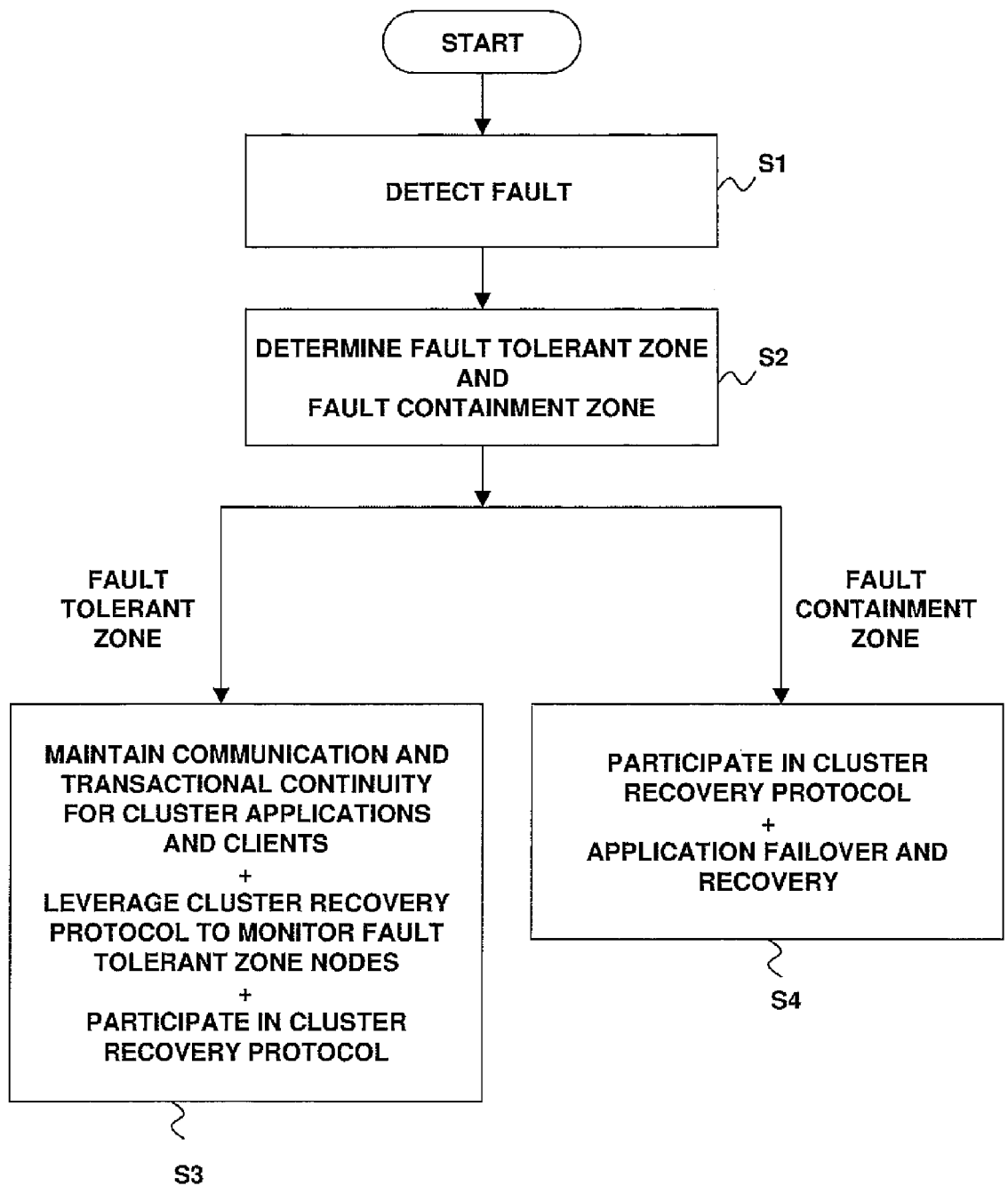
FIG. 7 is a flow diagram illustrating exemplary cluster recovery steps in accordance with the invention.

Turning now to FIG. 7, exemplary method steps are set forth to reiterate the various stages of cluster recovery that have been described above. Step S1 illustrates a fault being detected by a cluster leader as a result of an unreachable node being detected by the steady state heartbeat monitoring protocol. In step S2, the cluster leader determines the fault tolerant zone and the fault containment zone based on identification of the unreachable node(s). Step S3 represents the processing that takes place in the fault tolerant zone. As described above, this processing entails the cluster leader maintaining communication and transactional continuity on behalf of cluster applications and their clients, and leveraging the cluster recovery protocol to monitor fault tolerant zone nodes. Step S3 also entails the cluster management tier of each node in the fault tolerant zone participating in the normal cluster-wide recovery protocol. Step S4 represents the processing that takes place in the fault containment zone. As described above, this processing entails the cluster management tier of each node in the fault containment zone participating in the normal cluster-wide recovery protocol. The cluster application tier of such nodes participates in application failover and recovery.

III. Cluster Maintenance

After the M failed nodes have been repaired and restarted, they can rejoin the cluster to form new M spare or redundant nodes that are not assigned any cluster application partitions or workloads. During this rejoin protocol, the invention again ensures that only the cluster management tier is affected by the cluster membership view update. The cluster application tier is unaffected and there is no impact on application transactions. When a node departs from a cluster for planned maintenance or when a new node is introduced into the cluster, the invention ensures that the cluster will again be split into appropriate fault-tolerant and fault-containment groups (with/without spare nodes) for continuous application availability on the former and quick maintenance in the latter. For a departing node, its application silo functions can be transitioned to a spare node in analogous fashion to the recovery scenario described above. For an incoming node, it can either become a new spare node, or it can become a new active node with an assigned application workload. In both cases, transaction processing will be unaffected in the fault tolerant zone by these operations. Note, moreover, that spare nodes are not required in the fault containment zone insofar as these are only needed when existing nodes leave the cluster. Both the repaired node rejoin and node departure/addition scenarios constitute additional examples of how the present invention provides continuous availability for most of a cluster's application services.

Figure 8:
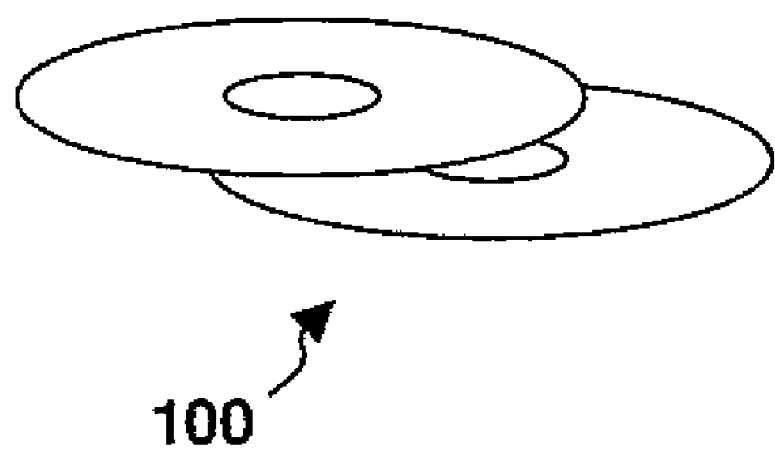
FIG. 8 is a diagrammatic illustration of storage media that can be used to store a computer program product for implementing intrusion detection functions in accordance with the invention.

Accordingly, a cluster partition recovery/maintenance technique has been disclosed that fulfills the objective of ensuring continuous availability for much of a cluster application, while minimizing disruption for the affected parts of the application upon the occurrence of a fault or during scheduled maintenance. It will be appreciated that the inventive concepts may be variously embodied in any of a data processing system, a machine implemented method, and a computer program product in which programming means are recorded on one or more data storage media for use in controlling a data processing system (e.g., a cluster leader) to perform the required functions. Exemplary data storage media for storing such programming means are shown by reference numeral 100 in FIG. 8. The storage media 100 are shown as being portable optical storage disks of the type that are conventionally used for commercial software sales. Such storage media can store the programming means of the invention, either alone or in conjunction with an operating system or other software product that incorporates the required functionality. The programming means could also be stored on other portable storage media (such as floppy disks, flash memory sticks, etc.) or on storage media combined with drive systems (e.g. disk drives) incorporated in computer platforms. More broadly, the storage media could comprise any electronic, magnetic, optical, semiconductor system, apparatus or device.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A computer program product recorded on one or more data storage media for use in a server cluster having plural nodes, comprising:

said one or more data storage media;

program logic recorded on said data storage media for programming a data processing platform to operate as by:

maintaining a set of active nodes that each run a software stack that includes a cluster management tier and a cluster application tier, said cluster application tier of said active nodes actively providing services on behalf of client applications;

maintaining a set of spare nodes that each run a software stack that includes said cluster management tier and said cluster application tier, said cluster application tier of said spare nodes being continuously operational during steady-state cluster application transaction processing, but not actively providing transaction services on behalf of client applications prior to assuming an application workload from another node;

dynamically logically defining first and second zones in said cluster in response to an active node membership change involving one or more active nodes departing from or being added to said cluster as a result of an active node failing or becoming unreachable or as a result of a maintenance operation involving an active node;

said first zone being a fault tolerant zone comprising all of said active nodes that are operational;

said second zone being a fault containment zone comprising all active nodes participating in said membership change and some number of said spare nodes in the event that said membership change involves a node departure;

implementing fast recovery/maintenance and high cluster application availability in said fault containment zone during cluster recovery or maintenance by initiating application failover and application recovery protocols that are implemented by said cluster application and cluster management tiers of nodes in said fault containment zone following said active node membership change;

maintaining continuous application cluster availability in said fault tolerant zone during cluster recovery or maintenance by continuing without interruption normal transactional application and related intra-cluster messaging protocols that were being implemented by said cluster application and cluster management tiers of nodes in said fault tolerant zone prior to said active node membership change; and said cluster management tier of nodes in said fault tolerant zone and said fault containment zone initiating cluster recovery protocols following said active node membership change, said cluster recovery protocols being transparent to said cluster application tier of nodes in said fault tolerant zone so as not to interfere with said normal transactional application and related intra-cluster messaging protocols implemented by nodes in said fault tolerant zone;

whereby group integrity is maintained and transactional application communication messaging continues without interruption in nodes of said fault tolerant zone as cluster recovery is performed.

2. A program product in accordance with claim 1 wherein transactional isolation is maintained between said fault tolerant zone and said fault containment zone by failing over client application services provided by any departing node(s) in said fault containment zone to a corresponding number of said spare nodes in said fault containment zone.

3. A program product in accordance with claim 1 wherein transactional continuity is maintained in said fault tolerant zone by guaranteeing cluster membership integrity in said fault tolerant zone as a result of exploiting a request/response-based cluster recovery communication protocol to monitor node membership integrity in said fault tolerant zone and removing from said fault tolerant zone a node that fails to provide a node response pursuant to said request/response-based communication protocol.

4. A program product in accordance with claim 1 wherein transactional continuity is maintained in said fault tolerant zone by guaranteeing communication continuity in said fault tolerant zone through absolute node identification independent of cluster size and retention of pre-recovery/maintenance communication sessions in the fault-tolerant zone.

5. A program product in accordance with claim 1 further including rejoining one or more departing nodes after repair or maintenance into said cluster as spare nodes.

6. A server cluster system having plural nodes adapted to provide cluster application services to clients that access said cluster, comprising:

program logic executable on at least one of said nodes to perform operations, said operations comprising:

maintaining a set of active nodes that each run a software stack that includes a cluster management tier and a cluster application tier, said cluster application tier of said active nodes actively providing services on behalf of client applications;

maintaining a set of spare nodes that each run a software stack that includes said cluster management tier and said cluster application tier, said cluster application tier of said spare nodes being continuously operational during steady-state cluster application transaction processing, but not actively providing transaction services on behalf of client applications prior to assuming an application workload from another node;

dynamically logically defining first and second zones in said cluster in response to an active node membership change involving one or more active nodes departing from or being added to said cluster as a result of an active node failing or becoming unreachable or as a result of a maintenance operation involving an active node;

said first zone being a fault tolerant zone comprising all of said active nodes that are operational;

said second zone being a fault containment zone comprising all active nodes participating in said membership change and some number of said spare nodes in the event that said membership change involves a node departure;

implementing fast recovery/maintenance and high cluster application availability in said fault containment zone during cluster recovery or maintenance by initiating application failover and application recovery protocols that are implemented by said cluster application and cluster management tiers of nodes in said fault containment zone following said active node membership change;

maintaining continuous application cluster availability in said fault tolerant zone during cluster recovery or maintenance by continuing without interruption normal transactional application and related intra-cluster messaging protocols that were being implemented by said cluster application and cluster management tiers of nodes in said fault tolerant zone prior to said active node membership change; and said cluster management tier of nodes in said fault tolerant zone and said fault containment zone initiating cluster recovery protocols following said active node membership change, said cluster recovery protocols being transparent to said cluster application tier of nodes in said fault tolerant zone so as not to interfere with said normal transactional application and related intra-cluster messaging protocols implemented by nodes in said fault tolerant zone;

whereby group integrity is maintained and transactional application communication messaging continues without interruption in nodes of said fault tolerant zone as cluster recovery is performed.

7. A system in accordance with claim 6 wherein transactional isolation is maintained between said fault tolerant zone and said fault containment zone by failing over client application services provided by any departing node(s) in said fault containment zone to a corresponding number of said spare nodes in said fault containment zone.

8. A system in accordance with claim 6 wherein transactional continuity is maintained in said fault tolerant zone by guaranteeing cluster membership integrity in said fault tolerant zone as a result of exploiting a request/response-based cluster recovery communication protocol to monitor node membership integrity in said fault tolerant zone and removing from said fault tolerant zone a node that fails to provide a node response pursuant to said request/response-based communication protocol.

9. A system in accordance with claim 6 wherein transactional continuity is maintained in said fault tolerant zone by guaranteeing communication continuity in said fault tolerant zone through absolute node identification independent of cluster size and retention of pre-recovery/maintenance communication sessions in the fault-tolerant zone.

10. A system in accordance with claim 6 further including rejoining one or more departing nodes after repair or maintenance into said cluster as spare nodes.

11. A computer program recorded on one or more data storage media product for use in a server cluster having plural nodes implementing a server tier in a client-server computing architecture to provide cluster recovery, comprising:

said one or more data storage media;

program logic recorded on said data storage media for programming a data processing platform to operate as by:

determining a first group of N active nodes that each run a software stack comprising a cluster management tier and a cluster application tier that actively provides services on behalf of one or more client applications running in a client application tier on said clients;

determining a second group of M spare nodes that each run a software stack comprising said cluster management tier and said cluster application tier, said cluster application tier of said spare nodes being continuously operational during steady-state cluster application transaction processing, but not actively providing transaction services on behalf of client applications prior to assuming an application workload from another node;

dynamically logically defining first and second zones in said cluster in response to an active node membership change involving one or more active nodes departing from or being added to said first group as a result of an active node failing or becoming unreachable or as a result of a maintenance operation involving an active node;

said first zone being a fault tolerant zone comprising all of said active nodes that are operational;

said second zone being a fault containment zone comprising all active nodes participating in said membership change and at most a corresponding number of said spare nodes in the event that said membership change involves a node departure;

implementing fast recovery/maintenance and high cluster application availability in said fault containment zone during recovery or maintenance by initiating application failover and application recovery protocols that are implemented by said cluster application and cluster management tiers of nodes in said fault containment zone following said active node membership change;

maintaining transactional isolation between said fault tolerant zone and said fault containment zone by failing over the client application services provided by any departing nodes in said fault containment zone to at most a corresponding number of said spare nodes in said fault containment zone;

maintaining continuous application cluster availability in said fault tolerant zone during recovery or maintenance by continuing without interruption normal transactional application and related intra-cluster messaging protocols that were being implemented by said cluster application and cluster management tiers of nodes in said fault tolerant zone prior to said active node membership change;

said cluster management tier of nodes in said fault tolerant zone and said fault containment zone initiating cluster recovery protocols following said active node membership change, said cluster recovery protocols being transparent to said cluster application tier of nodes in said fault tolerant zone so as not to interfere with said normal transactional application and related intra-cluster messaging protocols implemented by nodes in said fault tolerant zone;

maintaining transactional continuity in said fault tolerant zone by guaranteeing cluster membership integrity in said fault tolerant zone using a request/response-based cluster recovery communication protocol to monitor node membership integrity in said fault tolerant zone and remove nodes that fail to provide a node response, thus guaranteeing cluster membership integrity; and maintaining transactional continuity in said fault tolerant zone by guaranteeing communication continuity in said fault tolerant zone through absolute node identification independent of cluster size and retention of pre-recovery communication sessions in the fault-tolerant zone;

whereby group integrity is maintained and transactional application communication messaging continues without interruption in nodes of said fault tolerant zone as cluster recovery is performed.

* * * * *